United States Patent [19]

Bastioli et al.

[11] Patent Number: 5,234,977

[45] Date of Patent: Aug. 10, 1993

[54] STARCHY POLYMERIC MIXTURE PARTICULARLY FOR THE PRODUCTION OF FILMS AND THE LIKE AND A METHOD FOR ITS PRODUCTION

[75] Inventors: Catia Bastioli, Novara; Vittorio Bellotti, Fontaneto D'Agogna; Alessandro Montino, Lomellina; Gianfranco D. Tredici, Calende; Roberto Lombi, Novara, all of Italy

[73] Assignee: Novamont S.p.A., Milan, Italy

[21] Appl. No.: 734,492

[22] Filed: Jul. 23, 1991

[30] Foreign Application Priority Data

Jul. 25, 1990 [IT] Italy ............................. 67586 A/90

[51] Int. Cl.⁵ ............................. C08L 3/00; C08F 3/38
[52] U.S. Cl. ............................. 524/47; 524/48; 524/52; 524/55; 524/404; 524/405
[58] Field of Search ............... 523/128; 524/47, 52, 524/53, 405, 48, 404

[56] References Cited

U.S. PATENT DOCUMENTS

| | | | |
|---|---|---|---|
| 3,320,200 | 5/1967 | Kane | 524/53 |
| 3,652,542 | 3/1972 | Hjermstad | 260/233.3 R |
| 4,094,718 | 6/1978 | Czerwin | 524/52 |
| 4,673,438 | 6/1987 | Wittwer | 106/126 |
| 4,677,145 | 6/1987 | Krankkala | 524/48 |
| 4,933,383 | 6/1990 | Murdock et al. | 524/48 |
| 5,095,054 | 3/1992 | Lay et al. | 524/47 |

FOREIGN PATENT DOCUMENTS

| | | |
|---|---|---|
| 0032802 | 7/1981 | European Pat. Off. . |
| 0282451 | 9/1988 | European Pat. Off. . |
| 0298920 | 1/1989 | European Pat. Off. . |
| 0304401 | 2/1989 | European Pat. Off. . |
| 0326517 | 8/1989 | European Pat. Off. . |
| 0327505 | 8/1989 | European Pat. Off. . |
| 0391853 | 10/1990 | European Pat. Off. . |
| 0400532 | 12/1990 | European Pat. Off. . |
| 0404723 | 12/1990 | European Pat. Off. . |
| 0404727 | 12/1990 | European Pat. Off. . |
| 0404728 | 12/1990 | European Pat. Off. . |
| 0407350 | 1/1991 | European Pat. Off. . |
| 0408501 | 1/1991 | European Pat. Off. . |
| 0408502 | 1/1991 | European Pat. Off. . |
| 0408503 | 1/1991 | European Pat. Off. . |
| 0409781 | 1/1991 | European Pat. Off. . |
| 0409782 | 1/1991 | European Pat. Off. . |
| 0409783 | 1/1991 | European Pat. Off. . |
| 0409788 | 1/1991 | European Pat. Off. . |
| 0409789 | 1/1991 | European Pat. Off. . |
| 0019600 | 7/1970 | Japan ............................. 524/53 |
| 2190093 | 5/1986 | United Kingdom . |
| 8802313 | 3/1988 | United Kingdom . |

OTHER PUBLICATIONS

Chemical Abstracts, vol. 7, No. 8, p. 47, Abstract No. 60151n, F. H. Otey et al., "Starch-based blown films" (Aug. 24, 1987).

Otey, F. H. et al., Ind. Eng. Chem. Res. 26(8):1659-1663 (1987), "Starch-Based Blown Films".

*Primary Examiner*—Paul R. Michl
*Assistant Examiner*—LaVonda DeWitt
*Attorney, Agent, or Firm*—Bryan Cave

[57] ABSTRACT

The material, which is usable for the production of biodegradable articles in film, sheet or fiber form, can be produced by extrusion from a molten mass including a synthetic thermoplastic polymer and a destructured starch to which a boron containing compound, such as boric acid, metaboric acid, borax and derivatives thereof has been added. Articles made of this material have improved transparency, Young's modulus and tear strength.

20 Claims, No Drawings

STARCHY POLYMERIC MIXTURE PARTICULARLY FOR THE PRODUCTION OF FILMS AND THE LIKE AND A METHOD FOR ITS PRODUCTION

DESCRIPTION

The present invention relates to a mixture ("blend") of polymeric material useful for the production of biodegradable films, sheets and fibers obtainable from a melt comprising a synthetic thermoplastic polymer and a destructured starch, a method for the production of the material, and articles in film, sheet or fiber form produced from the material.

Polymeric compositions based on destructured starch and an essentially water insoluble thermoplastic polymer such as, for example, polyethylene, polyacetals, polyacrylonitriles and copolymers such as, the essentially water insoluble grades of ethylene-vinyl alcohol, ethylene-vinyl acetate, and ethylene-acrylic acid are known from the document EP-A-327505. These compositions are intended mainly for the production of molded articles having fair dimensional stability and a fairly high starch content.

The description indicates generally that such compositions may be used for the production of films and the like but provides no information regarding the problems connected with the production of such articles, particularly as regards the processing conditions and the specific characteristics of the polymers which are suitable for the production of filmable compositions and for achieving the properties of transparency and tear strength which constitute essential characteristics for films which can conveniently replace those currently used and produced for non-biodegradable polymers. The Applicant's patent application IT 67413-A/89, describes filmable polymeric compositions including destructured starch and ethylenevinyl alcohol copolymer and a method for their preparation.

The document EP-A-282,451 describes a method of preparing destructured starch in which an aqueous composition of chemically unmodified starch having a water content of the order of 15-25% of the weight of the composition is treated at a high temperature in a closed volume in the presence of a chain-cleaving catalyst. Among the cleaving catalysts mentioned are inorganic acids including boric acid, and their function would be to cleave the alpha 1-4 glucoside bonds of the starch macromolecules so as to reduce their molecular weights.

The compositions of this document, which do not include polymers or copolymers which are insoluble in water, are intended to be used for the production of molded articles with final water contents of the order of 12-19% but are not suitable for the extrusion or blow-extrusion of films and sheets, the purpose of the reduction of the molecular weight of the starch by means of the cleaving catalyst being to reduce the incidence of surface defects in the articles produced.

The object of the present invention is to provide compositions having improved properties, particularly as regards the transparency and tear strength of the films produced with the use of these compositions.

It has been discovered that this object can be achieved by the addition to the polymeric composition of a boron containing compound.

A subject of the invention is therefore a polymeric blend of the type indicated in the introductory paragraph, characterized in that the melt comprises a boron containing compound. Preferably the boron compound is selected from boric acid, metaboric acid, alkali and alkaline earth metal salts of said acids, borax and derivatives thereof.

It has been found that the use of boron containing compounds results in substantially better interpenetration between the hydrophilic starchy phase and the hydrophobic polymeric phase with a substantial improvement in mechanical properties, particularly tear strength and transparency of sheets and films obtained from the blends of the invention.

In a preferred embodiment of the invention, the percentage of the boron containing compound, expressed as the boron content, is between 0.002 and 0.4% and preferably between 0.01 and 0.3% of the total weight of the blend.

As will become clear from the experimental data given in the following description, the presence of the boron compounds results in a considerable improvement in the transparency and tear strength of articles produced from polymeric materials according to the invention.

An increase in the Young's modulus of these articles was also recorded.

As regards these characteristics, the addition of inorganic salts of alkali or alkaline-earth metals, particularly LiCl and NaCl at concentrations between 0.1 and 5% wt, preferably between 0.5 and 3% of the weight of the blend, was also found advantageous.

The term starch as used in the present description and in the claims generally includes all starches of natural or vegetable origin which are composed essentially of amylose and/or amylopectin. They can be extracted from various plants such as, for example, potatoes, rice, tapioca and maize and from cereals such as rye, oats and wheat. Maize starch is preferred. The term starch also includes modified starch whose acidity index has been reduced to a value between 3 and 6, as well as potato starch in which the types and concentrations of the cations associated with the phosphate group have been modified. Starch ethoxylates, acetates, cationic starches, starch oxides, cross-linked starches and the like may also be used.

The native starch, which is preferably used, has an intrinsic water content of about 9-15% wt.

Additional water may be added to the starch-polymer composition during processing in a total amount of up to 40% wt referred to the starch-water system.

The intrinsic water content of starch is however per se sufficient in the presence of a high boiling plasticizer, (boiling point higher than 150° C.), to provide, under the processing conditions, for the formation of a homogeneous thermoplastic melt of at least partially interpenetrated starch and synthetic polymer suitable for extrusion into a film.

The synthetic polymeric component includes polymers and copolymers of at least one ethylenically unsaturated monomer, the polymer or copolymer having repeating units provided with at least a polar group such as hydroxy, alkoxy, carboxy, carboxyalkyl, alkyl carboxy and acetal.

Preferred polymeric components include polyvinyl alcohol and copolymers of an olefin selected from ethylene, propylene, isobutene and styrene with acrylic acid, vinyl alcohol and/or vinyl acetate and mixtures thereof.

The above olefin copolymers include low melting ethylene copolymers having more than 50% by weight of ethylene, having melting points between 80° and 130° C., such as ethylene-acrylic acid, ethylene-vinyl alcohol, ethylene-vinyl acetate and mixtures thereof.

Particularly preferred are polyvinyl alcohol and ethylene-vinyl alcohol copolymers with an ethylene content of between 10 and 90%, preferably between 10 and 40%, by weight and a melt flow index between 2 and 50, preferably between 6 and 20, at 210° C. and with a force of 2.16 kg.

The above polymers are obtained by hydrolysis of the corresponding polyvinyl acetate or ethylene-vinyl acetate respectively. The degree of hydrolysis of the ethylene-vinyl alcohol is preferably between 100 and 50%.

The alcoholic units of the polymers mentioned above may be partly or wholly modified to produce:

1) ethers resulting from reaction with:
ethylene oxide,
ethylene oxide substituted by alkyl radicals up to $C_{20}$ or by aromatic radicals,
acrylonitrile ($Ce^{2+}$ initiator),
acrylamide,
arylalkyl halides,
chloracetic acid,
methylchloromethyl ether,
silanes 2) inorganic and organic esters such as sulphates, nitrates, phosphates, arsenates, xanthates, carbamates, urethanes, borates, titanates, 3) organic esters resulting from reactions with aliphatic or aromatic acids, chloroacyls, particularly of fatty acids or anhydrides, 4) acetals and ketals produced by reaction with:
aliphatic aldehydes with up to 22 carbon atoms,
unsaturated aliphatic aldehydes with up to 22 carbon atoms,
chloroacetaldehyde,
glyoxal,
aromatic aldehydes,
cyclic aliphatic aldehydes,
aliphatic ketones,
arylalkyl ketones,
alkylcycloalkyl ketones.

The reactions to produce the organic and inorganic esters and the acetals given above can easily be achieved as described in Chapter 9 and the literature cited in the publication "Polyvinyl alcohol" edited by C. A. Finch.

It is also possible to use polyvinyl alcohol and ethylene-vinyl alcohol multifunctional polymers (with ethylene contents of up to 44% by weight and degrees of hydrolysis of the acetate of between 100 and 50%) in which up to 50% of the ethylene may be substituted by co-monomers selected from the group consisting of:

propylene, isobutene, styrene, vinyl chloride, 1,1-dichloroethene, vinyl ethers of the formula $CH_2=CR-OR'$ in which R is hydrogen or a methyl group and R' is an alkyl group with from 1 to 18 carbon atoms, a cycloalkyl group or a polyether, acrylonitrile, methacrylonitrile, vinyl ketones of the formula $CH_2=CR-CO-CH_2-R'$ in which R is hydrogen or a methyl group and R' is hydrogen or a $C_1-C_6$ alkyl group, acrylic or methacrylic acid or their esters of the formula $CH_2=CR-COOR'$ in which R is hydrogen or a methyl group and R' is hydrogen or a $C_1-C_6$ alkyl group and the alkali metal or alkaline earth salts of these acids, vinyl derivatives of the formula $CH_2=CR-O-COR'$ in which R is hydrogen or a methyl group and R' is hydrogen, a methyl group, a methyl group mono-, bi- or tri-substituted with chloro or fluoro groups or $C_2-C_6$ alkyl groups, vinylcarbamates of the formula $CH_2=CR-CONR'R''$, in which R is hydrogen or a methyl group and R' and R'' are the same or different and are hydrogen or $C_1-C_3$ alkyl groups, maleic anhydride, fumaric anhydride, vinylpyrrolidone, vinylpyridine, or 1-vinylimidazole.

The copolymerisation is achieved with the use of radical initiators such as hydrogen peroxide, peroxysulphates and benzoyl peroxides, as described in the chapter "polymerization processes of vinyl esters" and the literature cited on pages 406 et. seq. of Volume 17 of the "Encyclopedia of Polymer Science and Engineering".

Compositions may also be used including starch, ethylenevinyl alcohol copolymer, possibly modified, and hydrophobic polymers of polyethylene or of its vinyl copolymers such as those cited above, or aliphatic polyesters (e.g. polyvinyl acetate, polycaprolactone, polyhydroxybutyrate (PHP) and polyhydroxybutyrate valerate (PHBV), polylactic acid, polyethylene and polybutylene adipates or sebacates), polyethers (e.g. polyoxymethylene, polyoxyethylene, polyoxypropylene, polyphenylene oxide), polyamides (nylon 6, nylon 12, etc.), polyacrylonitrile, polyurethanes, polyester/polyurethane copolymers, polyester/polyamide copolymers, polyglycolide, hydrophilic polymers such as: polyvinyl pyrrolidone, polyoxazoline, cellulose acetates and nitrates, regenerated cellulose, alkyl cellulose, carboxymethyl cellulose, casein-type proteins and salts thereof, natural gums such as gum arabic, algin and alginates, chitin and chitosan.

In a preferred embodiment of the invention, the polymeric material includes a synthetic thermoplastic polymer and destructured starch in a ratio of between 1:19 and 19:1, preferably between 1:4 and 4:1, by weight.

The polymeric material preferably includes a plasticizer with a high boiling point (boiling point above 150° C.) at a concentration of from 0.05 to 100% and preferably from 20 to 100% of the weight of the starch component (dry basis).

For example, the plasticizer may be a polyol such as ethylene glycol, propylene glycol, glycerine, polyglycerol, polyethylene glycol, sorbitol, mannitol, their acetate, ethoxylate or propoxylate derivatives and mixtures thereof.

The polymeric material may also include an agent for destructuring the starch such as urea in quantities of between 2 and 20% of the weight of the starch component, or alkali or alkaline-earth metal hydroxides.

The polymeric material may also include cross-linking agents such as aldehydes, acetals, ketones, glyoxals or the like. Moreover, it may include other additives for imparting specific properties to the articles which the material is used to produce. Thus, for example, stabilizers against ultraviolet radiation may be added to improve the resistance of the articles to sunlight. Other additives include conventional additives normally incorporated in starch-based compositions for molding or extrusion, such as fungicides, flame-proofing agents, herbicides, antioxidants, fertilizers, opacifiers, stabilizers and plasticizers. All these additives may be used in the conventional quantities know to experts in the art and may constitute up to 20% of the weight of the final composition.

The polymeric material has a water content (as extruded, before conditioning) of no more than 6% and preferably less than 4% of the total weight due to the intrinsic water content of the starch used or to water added as appropriate.

Preferred compositions comprise from about 20 to about 70% wt starch (dry basis); from about 10 to about 50% wt synthetic polymer or copolymer; from about 2 to about 40% wt high boiling plasticizer or mixture of plasticizers; from about 0 to about 10% urea, from about 1 to about 5 moisture (after extrusion, before conditioning), and from 0.002 to 0.4% boron.

Highly preferred compositions comprise:
a) from 30 to 60% wt starch (dry basis);
b) from 20 to 50% wt of a polymer selected from ethylene-vinyl alcohol (with ethylene content of from 10 to 40% wt, most preferably 28-40% wt), polyvinyl alcohol and ethylene-acrylic acid and mixtures thereof;
c) from 5 to 25% wt of a high boiling plasticizer or mixtures of plasticizers;
d) from 2 to 7% wt urea;
e) from 2 to 4% moisture (as extruded, before conditioning);
f) from 0.01 to 0.3% boron.

If component b) consists of a mixture of ethylene-vinyl alcohol and ethylene-acrylic acid, the latter is preferably used in the amount of 5 to 15% wt referred to ethylene-vinyl alcohol.

A further subject of the present invention is a method for the production of a blend of polymeric material of the type described above by forming a melt comprising a synthetic thermoplastic polymer and starch at a temperature between 100° and 220° C. (preferably 140°-220° C.), wherein said melt comprises a boron containing compound.

The pressures to which the blend is subjected during the heat treatment are those typical for extrusion in single and twin-screw extruders. Although the process is preferably carried out in an extruder, the starch, and synthetic polymer may be mixed by any device which ensure conditions of temperature and shear stress suitable to render the starch and the polymer used compatible from a rheological point of view.

It appears from microphotographic examinations carried out with a transmission electron microscope that the presence of the boron compounds of their derivatives enables better interpenetration between the starchy phase and the synthetic polymer phase (particularly ethylene-vinyl alcohol phase). As already stated, by virtue of this interpenetration, the articles produced by extrusion from the polymeric material according to the invention show good mechanical properties and transparency.

In a preferred embodiment of the invention, boric acid is added to the other components of the material in the form of a solid powder.

In another preferred embodiment of the invention, boric acid is added to the other components of the polymeric material dissolved in plasticizer, preferably water, glycerine or a mixture thereof.

The weight of the boric acid as a percentage of the weight of the plasticizer is calculated so as to obtain a concentration of boron in the final product of between 0.002 and 0.4% and preferably between 0.01 and 0.3% by weight.

A further subject of the present invention is an article in film, sheet or fiber form produced by the extrusion of a polymeric material of the type described above.

Further advantages and characteristics of the invention will become clear from the examples which follow provided purely by way of illustration.

Comparative example

A composition was prepared containing:
38% by weight of undried Globe 0341 Cerestar starch having a water content of 11%,
38% by weight of Clarene R-20 ethylene-vinyl alcohol copolymer from Solvay,
3% by weight of EAA 5981 ethylene-acrylic acid copolymer from Dow Chemical,
5% by weight of urea,
15.7% by weight of glycerine,
0.3% by weight of erucamide.

The components were supplied individually by a Licoarbo DC-10 batching plant to a Baker Perkins MPCV-30 double-screw-single-screw-extruder. The screw diameter in the double-screw region of the extruder was 30 mm with a length/diameter ratio of 10:1, whilst the single-screw region had a screw diameter of 38 mm and a length/diameter ratio of 8:1. The capillary nozzle mounted on the head of the single-screw region had a diameter of 4.5 mm. The extrusion temperature was 160° throughout the four heating regions. The extrusions produced were granulated and then blow-extruded to form a film by a Haake Rheomex model 252 extruder with a screw diameter of 19 mm, a length/diameter ratio of 19:1, and a filming head. The temperature was kept at 155° C. throughout the equipment, including the filming head.

EXAMPLE 1

A quantity of boric acid equal to 0.2% of the total weight was added to a formulation identical to that of the comparative example.

All the steps were carried out in the same way as those described in connection with the comparative example.

EXAMPLE 2

A quantity of boric acid equal to 0.4% of the total weight was added to a formulation identical to that of the comparative example. All the steps were carried out in the same way as those described in connection with the comparative example.

Rectangular test pieces were taken from all the extruded films (which were about 60 microns thick) and, after conditioning at 23° C. and 55% relative humidity for 24 hours, were subjected to mechanical tests and, in particular, tensile tests according to the ASTM D-882 standard and tear-strength tests according to the ASTM D-1938 standard, and to transparency tests.

In the last case, a double-beam UV-VIS spectrophotometer was used. For this operation, the instrument was zeroed in air in the wavelength range between 360 and 800 nanometers and the transmittance of the test pieces in question was evaluated in comparison with a polyethylene test piece.

Table 1 gives the results of the mechanical tests and Table 2 those of the transmittance tests with reference to certain wavelength values.

| Characteristics of the test pieces of the examples | | |
|---|---|---|
| Comparative Example | Example 1 | Example 2 |
| Young's Modulus 128 MPa | 160 MPa | 202 MPa |

-continued

Characteristics of the test pieces of the examples

| | Comparative Example | Example 1 | Example 2 |
|---|---|---|---|
| Ultimate elongation | 278% | 264% | 260% |
| *U.T.S. | 18 MPa | 17 MPa | 19 MPa |
| Breaking energy | 1650 kJ/m$^2$ | 1635 kJ/m$^2$ | 1760 kJ/m$^2$ |
| Tearing stress | 2–4 N/mm | 6–10 N/mm | 9–12 N/mm |

*Ultimate tensile strength
Note: with reference to the tearing stress, the first value defines the value at which a tear starts and the second the value at which it is propagated.

TABLE 2

UV-VIS Transmittance of the test pieces of the examples

| | Polythene | Comparative Example | Example 1 | Example 2 |
|---|---|---|---|---|
| Transmittance % at 750 nm | 84% | 17% | 65% | 73% |
| Transmittance % at 450 nm | 77% | 9% | 54% | 63% |
| Transmittance % at 360 nm | 72% | 7% | 48% | 56% |

It is clear from the tables that the values of the transmittance, Young's modulus and tearing stress are considerably increased in the test pieces made of polymeric materials in which boron compounds were included in the composition.

EXAMPLE 3

A quantity of 0.5% of boric acid was added to a formulation identical to that of the comparative example. Furthermore, the third heating region of the extruder was raised to 195° C. The rest of the steps were carried out as described in the reference example.

EXAMPLE 4

A quantity of 2% of LiCl was added to a formulation identical to that of Example 3 and the temperature of the third heating region of the extruder was brought to 205° C. All the rest of the steps were carried out as described in the comparative example.

EXAMPLE 5

A quantity of 2% of LiCl was added to a formulation identical to that of Example 3, and the temperature in the third heating region of the extruder was brought to 170° C. All the rest of the steps were carried out as described in the comparative example.

EXAMPLE 6

A quantity of 2% of LiCl was added to a formulation identical to that of the comparative Example 1, and the temperature in the third heating region of the extruder was brought to 170° C. All the rest of the steps were carried out as described in the comparative example.

The transmittance values of the test pieces produced in Examples 3–6 obtained by the method indicated above are given in Table 3.

TABLE 3

| | UV-VIS transmittance | | |
|---|---|---|---|
| | at 750 nm | at 450 nm | at 360 nm |
| Example 3 | 76 | 67 | 60 |
| Example 4 | 80 | 71 | 64 |
| Example 5 | 87 | 80 | 74 |
| Example 6 | 36 | 31 | 28 |

We claim:

1. A composition useful for the production of biodegradable films, sheets, and fibers obtained from a molten mass, said molten mass comprising a synthetic thermoplastic polymer, destructured starch, a high boiling point plasticizer, up to 40 weight percent water referred to the starch/water system, and a boron-containing compound.

2. A composition according to claim 1, characterized in that the percentage of the compound containing boron, expressed as the boron content, is between 0.002 and 0.4% wt.

3. A composition according to claim 2, characterized in that the percentage of the compound containing boron, expressed as the boron content, is between 0.01 and 0.3% wt.

4. A composition according to claim 1 wherein the boron containing compound is selected from the group consisting of boric acid, metaboric acid, borax and derivatives thereof.

5. A composition according to claim 1 wherein said synthetic thermoplastic polymer is a polymer of at least one ethylenically unsaturated monomer, said polymer having repeating units provided with at least a polar group, selected from the group consisting of hydroxy, alkoxy, carboxy, carboxyalkyl, alkyl carboxy and acetal.

6. A composition according to claim 5, wherein said polymer is selected from the group consisting of polyvinyl alcohol and copolymers of an olefin selected from the group consisting of ethylene, propylene, isobutene and styrene with acrylic acid, vinyl alcohol or vinyl acetate.

7. A composition according to claim 6 wherein the synthetic polymer is selected from the group consisting of ethylene-vinyl alcohol, polyvinyl alcohol, ethylene-acrylic acid and mixtures thereof.

8. A composition according to claim 7 wherein the ethylene-vinyl alcohol copolymer has an ethylene content of between 10 and 90% and a melt flow index between 2 and 50 (at 21° C. and with a force of 2.16 kg).

9. A composition according to claim 8, wherein the ethylene-vinyl alcohol copolymer has an ethylene content between 10 and 40% by weight and a melt flow index between 6 and 20 (at 210° C. and with a force of 2.16 kg) and hydrolysis degree from 50 to 100%.

10. A composition according to claim 1, wherein the synthetic polymer and the starch are present in a ratio of between 1:19 and 19:1 by weight.

11. A composition according to claim 1, wherein the high boiling plasticizer is present in a concentration of from 0.05 to 100% of the weight of the starch component.

12. A composition according to claim 11, wherein the plasticizer is selected from the group consisting of glycerine, polyglycerol, polyethylene glycol, ethylene glycol, propylene glycol, mannitol, sorbitol, their acetate, ethoxylate or propoxylate derivatives and mixtures thereof.

13. A composition according to claim 1, comprising a starch destructuring agent selected from the group consisting of urea, alkaline hydroxides, alkali-metal hydroxides, alkaline-earth hydroxides and mixtures thereof.

14. A composition according to claim 1, comprising inorganic salts of alkali metals or alkaline earth metals added at concentrations of between 0.1 and 5%.

15. A method of producing a composition as described in claim 1, by forming a molten mass comprising a synthetic thermoplastic polymer and starch at a temperature between 100° and 220° C., wherein said molten mass comprises a boron containing compound.

16. A method according to claim 15, wherein the boron compound is boric acid which is added together with a plasticizer selected from the group consisting of glycerine, polyglycerol, polyethylene glycol, ethylene glycol, propylene glycol, mannitol, sorbitol, their ethoxylate, propoxylate or acetate derivatives and mixtures thereof.

17. An article in film, sheet or fiber form, produced from a composition according to claim 1.

18. The composition of claim 1 wherein the composition is obtained by extruding the molten mass and wherein the composition comprises:
   (a) from about 10 to about 50 weight percent synthetic thermoplastic polymer;
   (b) from about 20 to about 70 weight percent starch on a dry basis;
   (c) from about 2 to about 40 weight percent high boiling point plasticizer;
   (d) from about 0.002 to about 0.4 weight percent boron;
   (e) from about 0 to about 10 weight percent urea; and
   (f) from about 1 to about 5 weight percent water.

19. The composition of claim 18 comprising:
   (a) from 20 to 50 weight percent synthetic thermoplastic polymer selected from the group consisting of
      (i) ethylene-vinyl alcohol having an ethylene content of from 10 to 40 weight percent;
      (ii) polyvinyl alcohol;
      (iii) ethylene-acrylic acid; and
      (iv) combinations thereof;
   (b) from 30 to 60 weight percent starch on a dry basis;
   (c) from 5 to 25 weight percent high boiling point plasticizer;
   (d) from 0.01 to 0.3 weight percent boron;
   (e) from 2 to 7 weight percent urea; and
   (f) from 2 to 4 weight percent water.

20. The composition of claim 19 wherein the ethylene-vinyl alcohol has an ethylene content of from 28-40 weight percent.

* * * * *